(12) United States Patent
Chen et al.

(10) Patent No.: US 12,047,025 B2
(45) Date of Patent: Jul. 23, 2024

(54) ELECTRIC DRIVE SYSTEM, POWERTRAIN, AND ELECTRIC VEHICLE

(71) Applicant: Huawei Digital Power Technologies Co., Ltd., Shenzhen (CN)

(72) Inventors: Yue Chen, Xi'an (CN); Xueliang Zhang, Xi'an (CN); Ningbo Feng, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/149,261

(22) Filed: Jan. 3, 2023

(65) Prior Publication Data

US 2023/0147551 A1 May 11, 2023

Related U.S. Application Data

(63) Continuation of application No. PCT/CN2021/110022, filed on Aug. 2, 2021.

(30) Foreign Application Priority Data

Oct. 21, 2020 (CN) .......................... 202011133767.3

(51) Int. Cl.
*H02P 27/08* (2006.01)
*H02M 3/00* (2006.01)
*H02M 3/335* (2006.01)

(52) U.S. Cl.
CPC .............. *H02P 27/08* (2013.01); *H02M 3/01* (2021.05); *H02M 3/335* (2013.01)

(58) Field of Classification Search
CPC .......... H02P 27/08; H02M 3/01; H02M 3/335
USPC ......................................................... 307/10.1
See application file for complete search history.

(56) References Cited

U.S. PATENT DOCUMENTS

| | | | |
|---|---|---|---|
| 2008/0185197 A1* | 8/2008 | Nakamura | B60W 10/06 701/112 |
| 2009/0115251 A1* | 5/2009 | Nakamura | B60L 58/24 180/65.29 |
| 2009/0115355 A1* | 5/2009 | Oyobe | H02M 7/493 318/34 |
| 2010/0078993 A1* | 4/2010 | Ichikawa | B60L 3/0046 307/10.1 |

* cited by examiner

*Primary Examiner* — Alfonso Perez Borroto
(74) *Attorney, Agent, or Firm* — Maier & Maier, PLLC

(57) ABSTRACT

An electric drive system is connected to a power battery pack to drive a motor, the motor includes an exciting winding, and the electric drive system includes a bus, a three-level inverter circuit, an electric excitation circuit, and a controller. The bus includes a positive bus and a negative bus. The three-level inverter circuit includes a first bus capacitor and a second bus capacitor. The first bus capacitor is connected between the positive bus and a bus midpoint, and the second bus capacitor is connected between the negative bus and the bus midpoint. A first input terminal of the electric excitation circuit is connected in parallel to the first bus capacitor, a second input terminal of the electric excitation circuit is connected in parallel to the second bus capacitor, and an output terminal of the electric excitation circuit is connected to the exciting winding of the motor.

20 Claims, 10 Drawing Sheets

ELECTRIC DRIVE SYSTEM, POWERTRAIN, AND ELECTRIC VEHICLE

CROSS-REFERENCE TO RELATED APPLICATIONS

This application is a continuation of International Application No. PCT/CN2021/110022, filed on Aug. 2, 2021, which claims priority to Chinese Patent Application No. 202011133767.3, filed on Oct. 21, 2020. The disclosures of the aforementioned applications are hereby incorporated by reference in their entireties.

TECHNICAL FIELD to the embodiments relate the field of power electronics technologies, an electric drive system, a control method, an electric excitation circuit, a powertrain, and an electric vehicle.

BACKGROUND

With aggravation of an energy shortage and environmental pollution in the modern society, as new energy vehicles, electric vehicles have attracted extensive attention from all walks of life. Because an electric drive system of an electric vehicle directly affects safety and efficiency of the electric vehicle, the electric drive system keeps being a hot research topic.

Compared with a conventional two-level electric drive system, a three-level electric drive system can effectively improve New European Driving Cycle (NEDC) efficiency of the electric drive system, reduce output voltage harmonic waves, and optimize electromagnetic interference performance. Therefore, the three-level electric drive system has gradually become a research object.

FIG. 1 is a schematic diagram of an existing three-level inverter circuit.

The three-level inverter circuit 10 is configured to convert a direct current supplied by a power battery pack into an alternating current and then supply the alternating current to a motor 20. A balance degree of an electric potential of a bus midpoint (a point O in the figure) of the three-level inverter circuit 10 directly affects performance of a three-level electric drive system. Therefore, it is crucial to balancing the electric potential of the bus midpoint.

In the conventional technology, the electric potential of the bus midpoint of the three-level inverter circuit 10 can be adjusted in a software control mode that is based on SVPWM Space Vector Pulse-Width Modulation (SVPWM), but an adjustment capability of this mode is limited. When an offset of the electric potential of the bus midpoint is large, it is difficult to balance the electric potential of the bus midpoint.

SUMMARY

The embodiments may provide an electric drive system, a control method, an electric excitation circuit, a powertrain, and an electric vehicle, to improve a capability of adjusting an electric potential of a bus midpoint.

According to a first aspect, the embodiments may provide an electric drive system. An input terminal of the electric drive system is connected to a power battery pack of an electric vehicle to drive a motor. The motor is an electric excitation motor or a hybrid excitation motor, and the motor includes an exciting winding. The electric drive system includes a bus, a three-level inverter circuit, an electric excitation circuit, and a controller. The bus includes a positive bus and a negative bus. The three-level inverter circuit includes a first bus capacitor and a second bus capacitor. The first bus capacitor is connected between the positive bus and a bus midpoint, and the second bus capacitor is connected between the negative bus and the bus midpoint. A first input terminal of the electric excitation circuit is connected in parallel to the first bus capacitor, a second input terminal of the electric excitation circuit is connected in parallel to the second bus capacitor, and an output terminal of the electric excitation circuit is connected to the exciting winding. The controller is configured to control a working state of the electric excitation circuit, to balance an electric potential of the bus midpoint.

The input terminals of the electric excitation circuit in the electric drive system respectively obtain power from the two bus capacitors. The controller controls the working state of the electric excitation circuit to excite the exciting winding of the motor, and controls power consumption to be different when the electric excitation circuit obtains power from the two bus capacitors, to balance the electric potential of the bus midpoint. By multiplexing the electric excitation circuit, no additional equalization circuit needs to be added in this solution. In addition, the electric potential of the bus midpoint can be balanced even if an offset of the electric potential of the bus midpoint is large.

Moreover, when an existing electric excitation circuit directly obtains power from the power battery pack, a requirement on withstand voltages of power devices in the electric excitation circuit is high, which leads to a difficulty in model selection and high costs. In contrast, power may be separately obtained from the two bus capacitors, and it is required that withstand voltages of power devices in the electric excitation circuit should be approximately half of those in the solution of the conventional technology, so that a switching loss of the power devices is reduced. At same output power, the electric excitation circuit may choose to use power devices with lower withstand voltages. Furthermore, when a volume of the power battery pack remains unchanged, currently, to increase a distance per charge of the electric vehicle to the utmost, a high-voltage power battery pack is usually selected for power supply. The electric drive system more convenient to implement a power supply solution by using the high-voltage power battery pack.

With reference to the first aspect, in a first possible implementation, the electric excitation circuit includes a first excitation circuit and a second excitation circuit. An input terminal of the first excitation circuit is the first input terminal of the electric excitation circuit, and an input terminal of the second excitation circuit is the second input terminal of the electric excitation circuit. The two excitation circuits respectively obtain power from the two bus capacitors.

With reference to the first aspect, in a second possible implementation, an output terminal of the first excitation circuit is connected in parallel to an output terminal of the second excitation circuit, and then the two output terminals are connected to the output terminal of the electric excitation circuit, to output an excitation current to the exciting winding. The controller controls working states of the first excitation circuit and the second excitation circuit based on an excitation current needed by the exciting winding and at least one of voltage sampling values of the buses and an output current sampling value of the three-level inverter circuit.

The voltage sampling values of the buses directly represent current voltages of the positive bus and the negative bus. When an absolute value of a voltage sampling value of the positive bus is different from that of a voltage sampling value of the negative bus, it indicates that the electric potential of the bus midpoint is imbalanced in this case.

The output current sampling value of the three-level inverter circuit can represent current voltage statuses of the positive bus and the negative bus. A direct current component of the output current is zero when the electric potential of the bus midpoint is balanced. A direct current component of the output current is greater than zero when the voltage of the positive bus is higher than that of the negative bus. A direct current component of the output current is less than zero when the voltage of the positive bus is lower than that of the negative bus.

With reference to the first aspect, in a third possible implementation, the controller adjusts switching frequencies of control signals of the first excitation circuit and the second excitation circuit to adjust output currents of the first excitation circuit and the second excitation circuit. A value of the output current of the first excitation circuit is positively correlated with the positive bus and an offset amplitude of the electric potential of the bus midpoint, and a value of the output current of the second excitation circuit is positively correlated with the negative bus and the offset amplitude of the electric potential of the bus midpoint.

For the hybrid excitation motor, the excitation current needed by the exciting winding is positively correlated with an output torque of the motor, and an offset amplitude of the electric potential of the bus midpoint of the three-level inverter circuit is also positively correlated with the output torque of the motor. Therefore, on a premise of ensuring that a value of the excitation current of the exciting winding satisfies a current requirement, a higher offset amplitude of an electric potential of an input terminal of an excitation circuit indicates a larger output current of the excitation circuit, to consume more quantity of electricity, thereby balancing the electric potential of the bus midpoint.

With reference to the first aspect, in a fourth possible implementation, the first excitation circuit includes a first LLC resonant conversion circuit and a first rectifier circuit, and the second excitation circuit includes a second LLC resonant conversion circuit and a second rectifier circuit. An input terminal of the first LLC resonant conversion circuit is the input terminal of the first excitation circuit, an output terminal of the first LLC resonant conversion circuit is connected to an input terminal of the first rectifier circuit, and an output terminal of the first rectifier circuit is the output terminal of the first excitation circuit. An input terminal of the second LLC resonant conversion circuit is the input terminal of the second excitation circuit, an output terminal of the second LLC resonant conversion circuit is connected to an input terminal of the second rectifier circuit, and an output terminal of the second rectifier circuit is the output terminal of the second excitation circuit. The controller controls working states of the first LLC resonant conversion circuit and the second LLC resonant conversion circuit.

With reference to the first aspect, in a fifth possible implementation, the first rectifier circuit and the second rectifier circuit include controllable switching transistors, and the controller controls working states of the controllable switching transistors to adjust output currents of the first rectifier circuit and the second rectifier circuit.

With reference to the first aspect, in a sixth possible implementation, the electric excitation circuit further includes a third rectifier circuit, the first excitation circuit includes a first LLC resonant conversion circuit, and the second excitation circuit includes a second LLC resonant conversion circuit. Primary-side windings of the first LLC resonant conversion circuit and the second LLC resonant conversion circuit have a same dotted terminal and a same quantity of coil turns and share a magnetic core of one transformer, and a secondary-side winding of the transformer is connected to the third rectifier circuit. Resonance frequencies of the first LLC resonant conversion circuit and the second LLC resonant conversion circuit are equal. An output terminal of the third rectifier circuit is the output terminal of the electric excitation circuit.

With reference to the first aspect, in a seventh possible implementation, the controller controls working states of the first LLC resonant conversion circuit and the second LLC resonant conversion circuit based on a same control signal. In this case, the two primary-side windings of the transformer have the same dotted terminal and share the magnetic core, that is, the windings are in a forward transformer relationship. Therefore, there is an energy exchange between the two LLC resonant conversion circuits. Energy is transferred from an LLC resonant conversion circuit with a higher input voltage to an LLC resonant conversion circuit with a lower input voltage, thereby balancing the electric potential of the bus midpoint.

With reference to the first aspect, in an eighth possible implementation, the controller adjusts a switching frequency of the control signal based on an excitation current needed by the exciting winding.

With reference to the first aspect, in a ninth possible implementation, the third rectifier circuit includes controllable switching transistors, and the controller controls working states of the controllable switching transistors to adjust an output current of the third rectifier circuit.

With reference to the first aspect, in a tenth possible implementation, the controller is further configured to control a working state of the three-level inverter circuit, that is, the controller and a controller of the three-level inverter circuit may be integrated with each other.

According to a second aspect, the embodiments may further provide a control method for an electric drive system. The method includes: determining voltage statuses of buses based on at least one of voltage sampling values of the buses and an output current sampling value of a three-level inverter circuit; and controlling a working state of an electric excitation circuit, to balance an electric potential of a bus midpoint.

According to a third aspect, the embodiments may further provide an electric excitation circuit. The electric excitation circuit includes a first input terminal, a second input terminal, a third input terminal, an output terminal, and a control terminal. The first input terminal is connected to a positive bus of an electric drive system, the second input terminal is connected to a bus midpoint, and the third input terminal is connected to a negative bus of the electric drive system. The output terminal is connected to an exciting winding of a motor and is configured to output an excitation current to the exciting winding. The control terminal is configured to receive a control signal. The electric excitation circuit is configured to balance an electric potential of the bus midpoint under the control of the control signal.

With reference to the third aspect, in a first possible implementation, the electric excitation circuit includes a first excitation circuit and a second excitation circuit. A first port of an input terminal of the first excitation circuit is the first input terminal, and a second port of the input terminal of the first excitation circuit is the second input terminal. A first port of an input terminal of the second excitation circuit is the third input terminal, and the second port of the input terminal of the first excitation circuit is the second input terminal.

With reference to the third aspect, in a second possible implementation, an output terminal of the first excitation circuit is connected in parallel to an output terminal of the second excitation circuit, and then the two output terminals are connected to the output terminal of the electric excitation circuit.

With reference to the third aspect, in a third possible implementation, the first excitation circuit includes a first LLC resonant conversion circuit and a first rectifier circuit, and the second excitation circuit includes a second LLC resonant conversion circuit and a second rectifier circuit. An input terminal of the first LLC resonant conversion circuit is the input terminal of the first excitation circuit, an output terminal of the first LLC resonant conversion circuit is connected to an input terminal of the first rectifier circuit, and an output terminal of the first rectifier circuit is the output terminal of the first excitation circuit. An input terminal of the second LLC resonant conversion circuit is the input terminal of the second excitation circuit, an output terminal of the second LLC resonant conversion circuit is connected to an input terminal of the second rectifier circuit, and an output terminal of the second rectifier circuit is the output terminal of the second excitation circuit.

With reference to the third aspect, in a fourth possible implementation, the electric excitation circuit further includes a third rectifier circuit, the first excitation circuit includes a first LLC resonant conversion circuit, and the second excitation circuit includes a second LLC resonant conversion circuit. Primary-side windings of the first LLC resonant conversion circuit and the second LLC resonant conversion circuit have a same dotted terminal and a same quantity of coil turns and share a magnetic core of one transformer, and a secondary-side winding of the transformer is connected to the third rectifier circuit. Resonance frequencies of the first LLC resonant conversion circuit and the second LLC resonant conversion circuit are equal. An output terminal of the third rectifier circuit is the output terminal of the electric excitation circuit.

According to a fourth aspect, the embodiments may further provide a powertrain. The powertrain includes the electric drive system provided above and further includes a motor. The motor is an electric excitation motor or a hybrid excitation motor. The motor is connected to an output terminal of a three-level inverter circuit. The motor is configured to convert electrical energy into mechanical energy to drive an electric vehicle.

According to a fifth aspect, the embodiments may further provide an electric vehicle. The electric vehicle includes the powertrain and the power battery pack that are provided above. The power battery pack is configured to provide a needed direct current power supply for the powertrain.

DETAILED DESCRIPTION OF THE EMBODIMENTS

To make a person skilled in the art better understand the embodiments, the following first describes an electric drive system.

Figure 1:
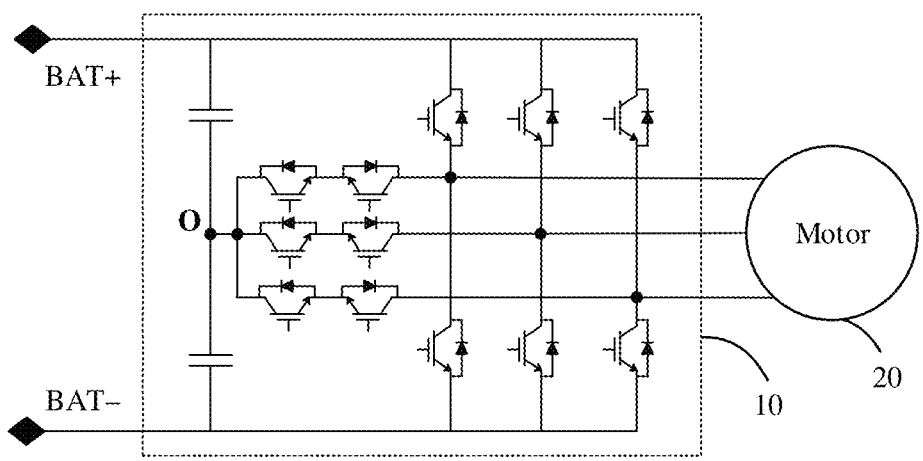
FIG. 1 is a schematic diagram of an existing three-level inverter circuit.
Figure 2:
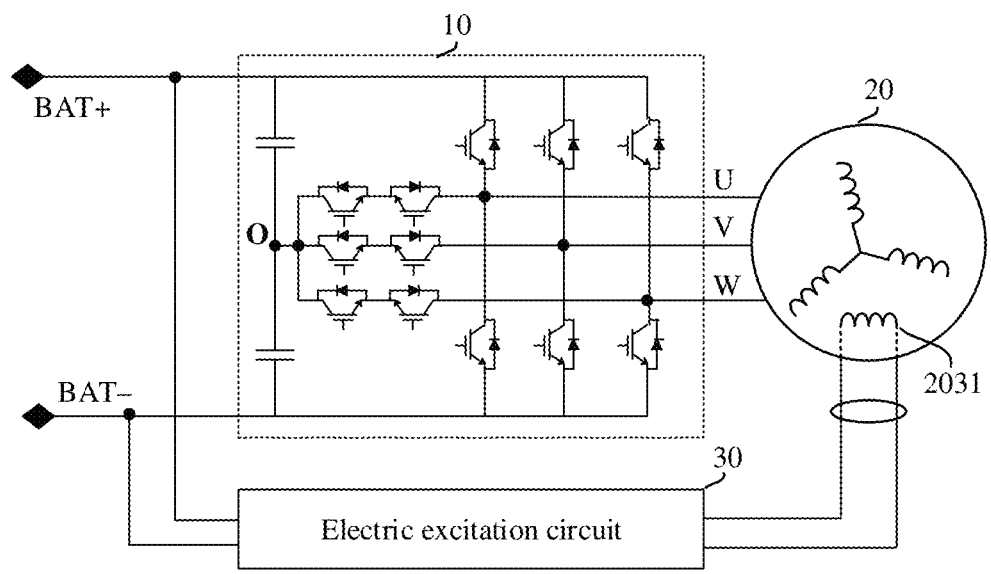
FIG. 2 is a schematic diagram of a three-level electric drive system corresponding to FIG. 1.

FIG. 2 is a schematic diagram of a three-level electric drive system corresponding to FIG. 1.

The three-level electric drive system uses a three-level conversion converter 10 to convert a direct current supplied by a power battery pack into an alternating current and then supply the alternating current to a motor 20.

The motor 20 is a hybrid excitation motor or an electric excitation motor, and the motor 20 includes an exciting winding 2031. When the motor 20 works, an electric excitation circuit 30 outputs an excitation current to the exciting winding 2031.

The following uses an example for detailed description in which the motor 20 is a hybrid excitation motor.

The hybrid excitation motor suitably incorporates two excitation modes, namely, permanent magnet excitation and electric excitation, properly changes a topology structure of the motor, maximizes advantages of the two excitation modes and overcomes their respective disadvantages. This maintains high efficiency and power density of the electric drive system and enables the electric drive system to have adjustable excitation, a wide speed regulation range, and other characteristics.

Based on interaction relationships between magnetic potentials of permanent magnets and magnetic potentials of electric excitation in hybrid excitation motors, the hybrid excitation motors may usually be classified into three types: a series magnetic circuit type, a parallel magnetic circuit type, and a series-parallel hybrid magnetic circuit type. For the series magnetic circuit type, the magnetic potential of the permanent magnet is connected in series to the magnetic potential generated by the electric excitation, to form an air gap magnetic field together. For the parallel magnetic circuit type, there is usually a radial magnetic circuit and an axial magnetic circuit, and a magnetic circuit of a permanent magnet and a magnetic circuit of electric excitation are independent of each other but interact with each other in an air gap to form a main magnetic field of the motor together. For the series-parallel hybrid magnetic circuit type, a magnetic circuit of a permanent magnet and a magnetic circuit of electric excitation have both a series part and a parallel part and form a main magnetic field of the motor together.

The following uses a hybrid excitation motor of the parallel magnetic circuit type as an example for description.

Figure 3:
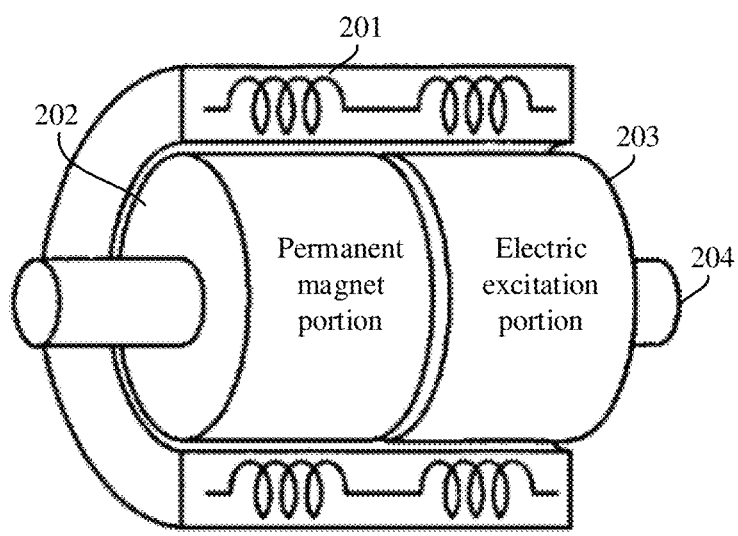
FIG. 3 is a schematic diagram of an existing hybrid excitation motor.

FIG. 3 is a schematic diagram of an existing hybrid excitation motor.

A permanent magnet portion 202 and an electric excitation portion 203 in the hybrid excitation motor of the parallel magnetic circuit type are located on a rotating shaft 204 and share an armature winding 201.

In the hybrid excitation motor of the parallel structure, the permanent magnet portion 202 and the electric excitation portion 203 form a main magnetic field of the motor together, to implement regulation and control of an air gap magnetic field of the motor, and improve a speed regulation, drive performance, or voltage regulation protection characteristic of the motor. To inherit an advantage of high efficiency of a permanent magnet motor to the utmost, an excitation source is provided by the permanent magnet portion 202, and the electric excitation portion 203 includes an exciting winding 2031.

An electric excitation circuit 30 obtains a direct current from a power battery pack of an electric vehicle and outputs an excitation current to the exciting winding 2031. By changing a value of the excitation current output to the exciting winding 2031, a magnetic flux of a main magnetic circuit is enhanced or weakened, thereby implementing a regulation function.

A balance degree of an electric potential of a bus midpoint of a three-level inverter circuit 10 directly affects many indicators such as withstand voltages and harmonic waves of output currents that are of power devices in the three-level inverter circuit 10. In the conventional technology, the electric potential of the bus midpoint of the three-level inverter circuit 10 can be adjusted in a software control mode that is based on SVPWM, but an adjustment capability of this mode is limited.

For example, in some scenarios, modulation of the three-level inverter circuit 10 is high, and a power factor is low. In this case, voltage fluctuation of dozens of volts may occur in the electric potential of the bus midpoint. This exceeds an adjustment range of the software control mode, and consequently the electric potential of the bus midpoint cannot be balanced.

When the motor driven by the electric drive system is an electric excitation motor, the foregoing problem also exists. Details are not described in this embodiment.

To resolve the foregoing problem in the conventional technology, the embodiments may provide an electric drive system, an electric excitation circuit, a control method, a powertrain, and an electric vehicle. A first input terminal of the electric excitation circuit is connected in parallel to a first bus capacitor, and a second input terminal of the electric excitation circuit is connected in parallel to a second bus capacitor, that is, the electric excitation circuit separately obtains power from the two bus capacitors. A controller is configured to: control a working state of the electric excitation circuit to excite an exciting winding of the motor, and control power consumption to be different when the electric excitation circuit obtains power from the two bus capacitors, to balance an electric potential of a bus midpoint. By multiplexing the electric excitation circuit, no additional equalization circuit needs to be added in this solution. In addition, the electric potential of the bus midpoint can be balanced even if an offset of the electric potential of the bus midpoint is large.

Terms such as "first" and "second" are merely intended for description and shall not be understood as an indication or implication of relative importance or implicit indication of a quantity of indicated features.

Unless otherwise clearly specified and limited, a term "connection" should be understood in a broad sense. For example, a "connection" may be a fixed connection, a detachable connection, or an integrated structure, may be a direct connection, or may be an indirect connection through an intermediary.

Embodiment 1

An embodiment may provide an electric drive system for a motor, configured to drive a motor having an exciting winding and an electric excitation circuit, such as an electric excitation motor or a hybrid excitation motor. The following provides a detailed description with reference to the accompanying drawings.

Figure 4:
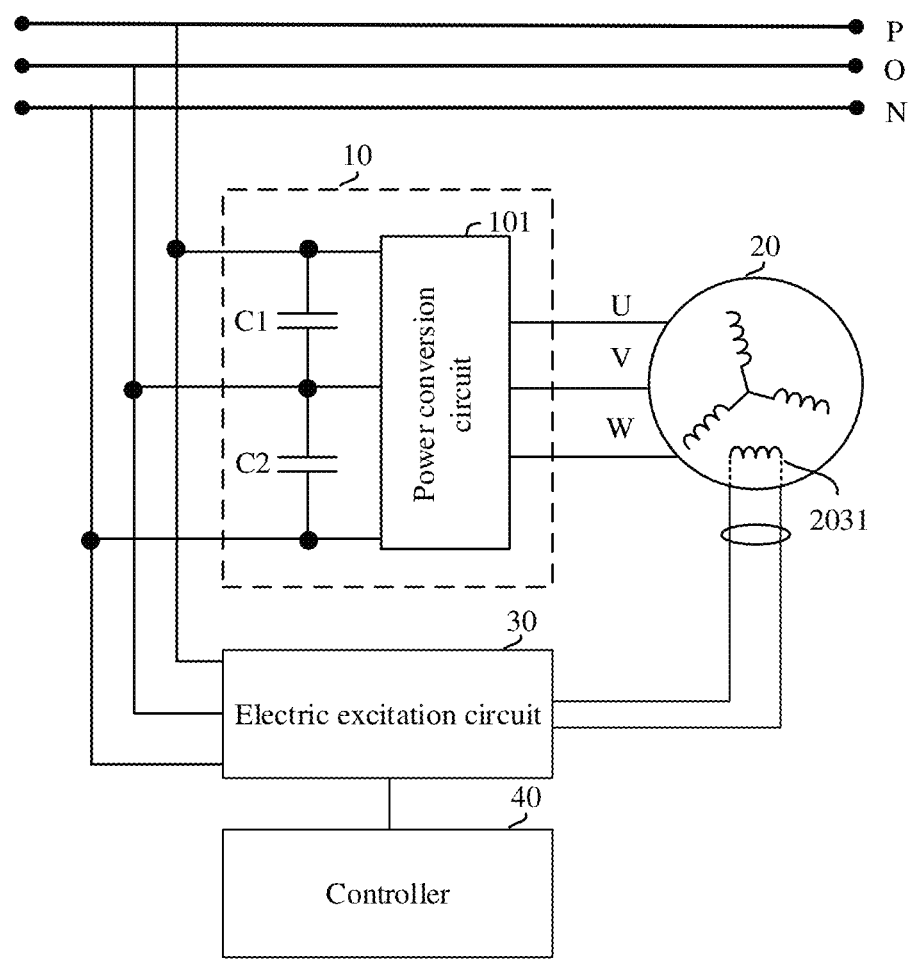
FIG. 4 is a schematic diagram of an electric drive system according to an embodiment of this application.

FIG. 4 is a schematic diagram of an electric drive system according to an embodiment.

The electric drive system includes a bus, a three-level inverter circuit 10, an electric excitation circuit 30, and a controller 40.

The bus includes a positive bus P and a negative bus N.

An input terminal of the three-level inverter circuit 10 is connected to a power battery pack 60, and an output terminal of the three-level inverter circuit 10 is connected to a motor 20. The three-level inverter circuit 10 is configured to convert a direct current supplied by the power battery pack 60 into an alternating current and then supply the alternating current to the motor 20.

The three-level inverter circuit 10 includes a first bus capacitor C1, a second bus capacitor C2, and a power conversion circuit 101.

The first bus capacitor C1 is connected between the positive bus P and a bus midpoint O, and the second bus capacitor C2 is connected between the negative bus N and the bus midpoint O.

Figure 5:
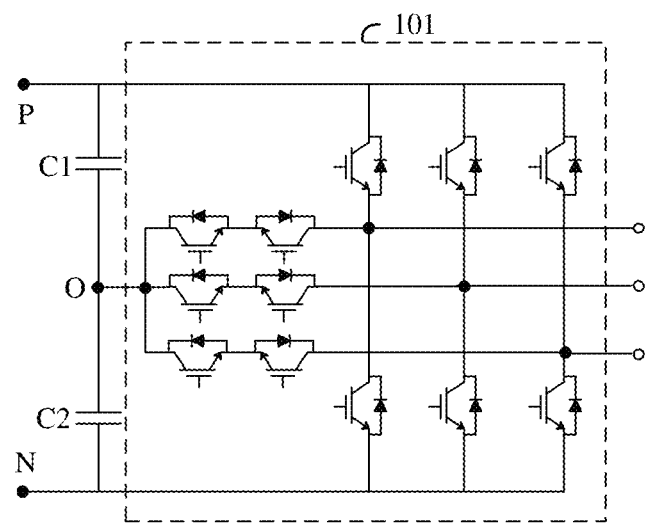
FIG. 5 is a schematic diagram of a neutral point clamped three-level inverter circuit.
Figure 6:
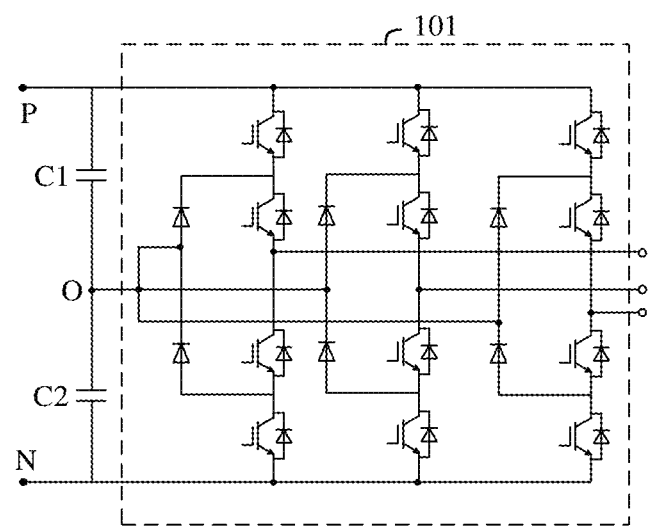
FIG. 6 is a schematic diagram of another neutral point clamped three-level inverter circuit.

In some embodiments, the three-level inverter circuit 10 is a neutral point clamped (NPC) three-level inverter circuit. FIG. 5 and FIG. 6 are schematic diagrams of neutral point clamped three-level inverter circuits. FIG. 5 is a schematic diagram of the power conversion circuit 101 using a T-shaped connection. FIG. 6 is a schematic diagram of a power conversion circuit 101 using an I-shaped connection.

Figure 7:
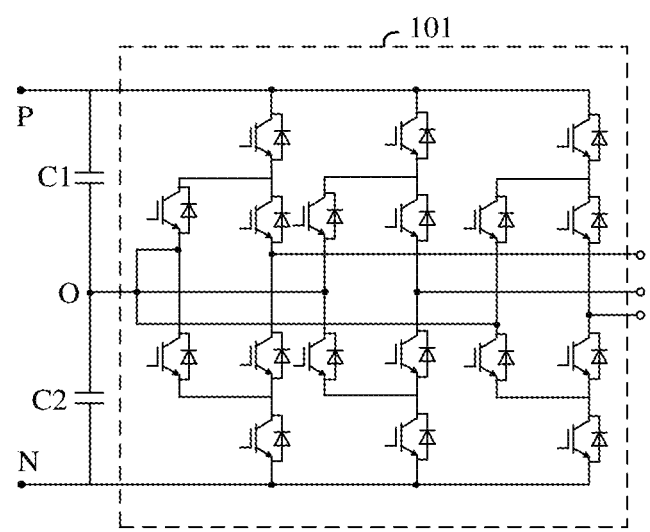
FIG. 7 is a schematic diagram of an active neutral point clamped three-level inverter circuit.

In some other embodiments, the three-level inverter circuit 10 may alternatively be an active neutral point clamped (ANPC) three-level inverter circuit. For a schematic diagram of the circuit, reference may be made to FIG. 7.

An implementation and a working principle of the three-level inverter circuit 10 are relatively mature technologies. Details are not described in this embodiment.

The electric excitation circuit 30 is configured to output an excitation current to an exciting winding 2031. By changing a frequency and a value of the excitation current output to the exciting winding 2031, a magnetic flux of a main magnetic circuit is enhanced or weakened, thereby improving a speed regulation, drive performance, or voltage regulation protection characteristic of the motor.

A first input terminal of the electric excitation circuit 30 is connected in parallel to the first bus capacitor C1, and a second input terminal of the electric excitation circuit 30 is connected in parallel to the second bus capacitor C2, that is, the electric excitation circuit separately obtains power from the two bus capacitors.

The excitation current of the exciting winding 2031 is positively correlated with an output torque of the motor, and an offset amplitude of the electric potential of the bus midpoint of the three-level inverter circuit 10 is also positively correlated with the output torque of the motor. Therefore, on a premise of ensuring that the value of the excitation current of the exciting winding 2031 satisfies a current requirement, the controller 40 controls a working state of the electric excitation circuit 30 to make the electric excitation circuit 301 obtain different quantities of electricity from the first bus capacitor C1 and the second bus capacitor C2, thereby balancing the electric potential of the bus midpoint.

The controller 40 in this embodiment may be an application-specific integrated circuit (ASIC), a programmable logic device (PLD), a digital signal processor (DSP), or a combination thereof. The PLD may be a complex programmable logic device (CPLD), a field-programmable gate array (FPGA), a generic array logic (GAL), or any combination thereof. This is not limited in this embodiment.

The electric excitation circuit 301 includes controllable switching transistors. A type of the controllable switching transistor is not limited in this embodiment. For example, the controllable switching transistor may be an insulated gate bipolar transistor (IGBT), a metal-oxide-semiconductor field-effect transistor (MOSFET, which is referred to as a MOS transistor below), or a silicon carbide metal-oxide-semiconductor field-effect transistor (SiC MOSFET).

The controller 40 may send a control signal to the controllable switching transistors to control working states of the controllable switching transistors.

Compared with the conventional technology, the input terminals of the electric excitation circuit in the electric drive system obtain power not from the power battery pack but respectively from the two bus capacitors; and the controller controls the working state of the electric excitation circuit and makes power consumption different when the electric excitation circuit obtains power from the two bus capacitors, thereby balancing the electric potential of the bus midpoint. By multiplexing the electric excitation circuit, no additional equalization circuit needs to be added in this solution. In addition, the electric potential of the bus midpoint can be balanced even if an offset of the electric potential of the bus midpoint is large.

Moreover, when an existing electric excitation circuit directly obtains power from the power battery pack, a requirement on withstand voltages of power devices in the electric excitation circuit is high, which leads to a difficulty in model selection and high costs. In contrast, power may be separately obtained from the two bus capacitors, and it is required that withstand voltages of power devices in the electric excitation circuit should be approximately half of those in the conventional technology, so that a switching loss of the power devices is reduced. At same output power, the electric excitation circuit may choose to use power devices with lower withstand voltages.

Furthermore, when a volume of the power battery pack remains unchanged, currently, to increase a distance per charge of an electric vehicle to the utmost, a high-voltage power battery pack is usually selected for power supply. For example, a power battery pack with an output voltage of 550 V to 850 V is used for power supply. In contrast, in the conventional technology, input terminals of an electric excitation circuit are directly connected in parallel to a power battery pack, a requirement on withstand voltages of power devices in the electric excitation circuit is high, and power devices that have resistance to a high voltage (a specification of 900 V) and a large current need to be selected during model selection. This leads to difficulties in model selection of the power devices and high costs. In contrast, voltages of power devices in each conversion circuit may be approximately half of those in the solution of the conventional technology, so that the switching loss of the power devices is reduced. At same output power, the electric excitation circuit may select power devices with lower withstand voltages (for example, a specification of 650 V). The electric drive system may implement a power supply solution by using the high-voltage power battery pack.

The following provides a description with reference to an implementation of the electric excitation circuit.

Embodiment 2

Figure 8:
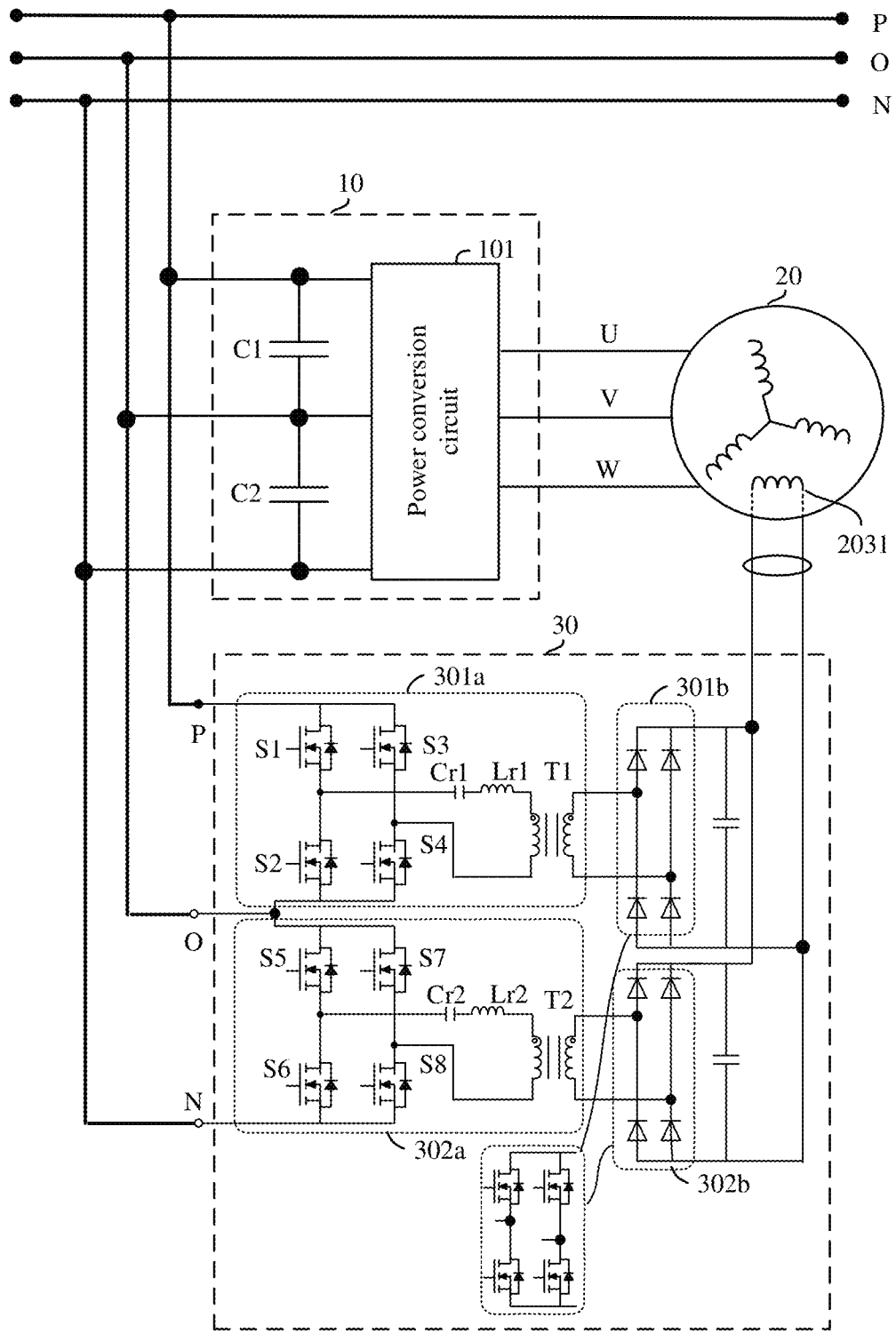
FIG. 8 is a schematic diagram of another electric drive system according to an embodiment.

FIG. 8 is a schematic diagram of another electric drive system according to an embodiment.

An electric excitation circuit 30 in the electric drive system includes a first excitation circuit and a second excitation circuit.

An input terminal of the first excitation circuit is a first input terminal of the electric excitation circuit 30.

The first excitation circuit includes a first LLC resonant conversion circuit 301*a* and a first rectifier circuit 301*b*, and the second excitation circuit includes a second LLC resonant conversion circuit 302*a* and a second rectifier circuit 302*b*.

An input terminal of the first LLC resonant conversion circuit 301*a* is the input terminal of the first excitation circuit, and an output terminal of the first LLC resonant conversion circuit 301*a* is connected to an input terminal of the first rectifier circuit 301*b*.

The illustrated first LLC resonant conversion circuit 301*a* includes a full-bridge inverter circuit formed by switching transistors S1-S4, a capacitor Cr1, an inductor Lr1, and a first transformer T1.

An output terminal of the first rectifier circuit 301*b* is an output terminal of the first excitation circuit.

An input terminal of the second excitation circuit is a second input terminal of the electric excitation circuit 30.

An input terminal of the second LLC resonant conversion circuit 302*a* is the input terminal of the second excitation circuit, and an output terminal of the second LLC resonant conversion circuit 302*a* is connected to an input terminal of the second rectifier circuit.

The illustrated second LLC resonant conversion circuit 302*a* includes a full-bridge inverter circuit formed by switching transistors S5-S8, a capacitor Cr2, an inductor Lr2, and a second transformer T2.

An output terminal of the second rectifier circuit 302*b* is an output terminal of the second excitation circuit.

The output terminal of the first excitation circuit is connected in parallel to the output terminal of the second excitation circuit, and then the two output terminals are connected to an output terminal of the electric excitation circuit 30.

A controller is configured to control working states of the first LLC resonant conversion circuit 301*a* and the second LLC resonant conversion circuit 302*a*. The following provides a detailed description.

The controller controls working states of the first excitation circuit and the second excitation circuit based on an excitation current needed by an exciting winding and at least one of voltage sampling values of buses and an output current sampling value of a three-level inverter circuit.

The following first describes a principle of balancing an electric potential of a bus midpoint by using the voltage sampling values of the buses.

The voltage sampling values of the buses directly represent current voltages of a positive bus and a negative bus. When a voltage sampling value of the positive bus is different from an absolute value of a voltage sampling value of the negative bus, it indicates that the electric potential of the bus midpoint is imbalanced in this case.

When the voltage sampling value of the positive bus is equal to the absolute value of the voltage sampling value of the negative bus, it indicates that the voltage of the positive bus is equal to an absolute value of the voltage of the negative bus, and that the electric potential of the bus midpoint is balanced in this case. In this case, the controller controls the first LLC resonant conversion circuit and the second LLC resonant conversion circuit to output currents with a same value, and a sum of the two currents is a currently needed excitation current.

When the voltage sampling value of the positive bus is greater than the absolute value of the voltage sampling value of the negative bus, it indicates that the voltage of the positive bus is greater than an absolute value of the voltage of the negative bus in this case. The controller obtains a currently needed excitation current and controls a sum of output currents of the first LLC resonant conversion circuit and the second LLC resonant conversion circuit to be the currently needed excitation current, and an output current of the first LLC resonant conversion circuit is greater than an output current of the second LLC resonant conversion circuit. In this case, the first LLC resonant conversion circuit obtains more quantity of electricity from a first bus capacitor C1, and then the voltage of the positive bus is made decreased. When the voltage of the positive bus decreases to the absolute value of the voltage of the negative bus, the controller controls the first LLC resonant conversion circuit and the second LLC resonant conversion circuit to output currents with a same value, to balance the electric potential of the bus midpoint.

When the voltage sampling value of the positive bus is less than the absolute value of the voltage sampling value of the negative bus, it indicates that the voltage of the positive bus is less than an absolute value of the voltage of the negative bus in this case. The controller obtains a currently needed excitation current and controls a sum of output currents of the first LLC resonant conversion circuit and the second LLC resonant conversion circuit to be the currently needed excitation current, and an output current of the first LLC resonant conversion circuit is less than an output current of the second LLC resonant conversion circuit. In this case, the second LLC resonant conversion circuit obtains more quantity of electricity from a second bus capacitor C2, and then the absolute value of the voltage of the negative bus is made decreased. When the absolute value of the voltage of the negative bus decreases to the voltage of the positive bus, the controller controls the first LLC resonant conversion circuit and the second LLC resonant conversion circuit to output currents with a same value, to balance the electric potential of the bus midpoint.

For ease of understanding, the following uses an example in which an output voltage of a power battery pack is 750 V. When the voltage of the positive bus is +375 V and the voltage of the negative bus is −375 V, the voltage sampling values corresponding to the positive bus and the negative bus are equal in this case, and the electric potential of the direct-current bus midpoint is balanced. When the voltage of the positive bus is +380 V and the voltage of the negative bus is −370 V, the voltage sampling value of the positive bus is greater than the absolute value of the voltage sampling value of the negative bus, indicating that the voltage of the positive bus is relatively high in this case. The controller controls the output current of the first LLC resonant conversion circuit to be greater than the output current of the second LLC resonant conversion circuit, to reduce the voltage of the positive bus. When the voltage of the positive bus is +370 V and the voltage of the negative bus is −380 V, the voltage sampling value of the positive bus is less than the absolute value of the voltage sampling value of the negative bus, indicating that the voltage of the negative bus is relatively high in this case (the absolute value of the voltage of the negative bus is large). The controller controls the output current of the first LLC resonant conversion circuit to be less than the output current of the second LLC resonant conversion circuit, to reduce the voltage of the negative bus (that is, reduce the absolute value of the voltage of the negative bus).

In actual application, considering impact of a measurement error, a deviation threshold may be preset in this embodiment. When a difference between the voltage sampling value of the positive bus and the absolute value of the voltage sampling value of the negative bus is less than the deviation threshold, it is determined that the electric potential of the direct-current bus midpoint is balanced. When the difference is greater than or equal to the deviation threshold, it is determined that the electric potential of the bus midpoint is imbalanced.

The deviation threshold may be determined based on an actual situation. This is not limited in this embodiment. For example, when the deviation threshold indicates that a difference between the voltage of the positive bus and the absolute value of the voltage of the negative bus is less than 3 V, it is determined that the electric potential of the direct-current bus midpoint is balanced.

The following describes a principle of balancing the electric potential of the bus midpoint by using the output current sampling value of the three-level inverter circuit.

The output current sampling value of the three-level inverter circuit can represent current voltage statuses of the positive bus and the negative bus. A direct current component of the output current may be zero when the electric potential of the bus midpoint is balanced. A direct current component of the output current is greater than zero when the voltage of the positive bus is higher than that of the negative bus. A direct current component of the output current is less than zero when the voltage of the positive bus is lower than that of the negative bus.

Therefore, the controller may control the working states of the first LLC resonant conversion circuit and the second LLC resonant conversion circuit based on a direct current component of the output current sampling value of the three-level inverter circuit.

When the direct current component of the output current sampling value is zero, the electric potential of the bus midpoint is balanced in this case. The controller controls the first LLC resonant conversion circuit and the second LLC resonant conversion circuit to output a same current. A sum of the two currents is a currently needed excitation current.

When the direct current component of the output current sampling value is greater than zero, the controller obtains a currently needed excitation current and controls a sum of output currents of the first LLC resonant conversion circuit and the second LLC resonant conversion circuit to be the currently needed excitation current, and an output current of the first LLC resonant conversion circuit is greater than an output current of the second LLC resonant conversion circuit. Then, the voltage of the positive bus is made decreased. When the voltage of the positive bus decreases to the absolute value of the voltage of the negative bus, the controller controls the first LLC resonant conversion circuit and the second LLC resonant conversion circuit to output currents with a same value.

When the direct current component of the output current sampling value is less than zero, the controller obtains a currently needed excitation current and controls a sum of output currents of the first LLC resonant conversion circuit and the second LLC resonant conversion circuit to be the currently needed excitation current, and an output current of the first LLC resonant conversion circuit is less than an output current of the second LLC resonant conversion circuit. Then, the absolute value of the voltage of the negative bus is made decreased. When the absolute value of the voltage of the negative bus decreases to the voltage of the positive bus, the controller controls the first LLC resonant conversion circuit and the second LLC resonant conversion circuit to output currents with a same value.

In actual application, considering impact of a measurement error, a deviation range may be preset in this embodiment. When the direct current component of the output current sampling value falls within the deviation range, it is determined that the electric potential of the direct-current bus midpoint is balanced. When the direct current component of the output current sampling value exceeds the deviation range, it is determined that the electric potential of the bus midpoint is imbalanced.

The deviation range may be determined based on an actual situation. This is not limited in this embodiment.

The controller may use either of the foregoing two manners as a criterion or may also use both of the foregoing two manners as a criterion. When it is determined, based on one of the two results, that the electric potential of the bus midpoint is imbalanced, the controller starts to adjust output power of the two conversion circuits. Alternatively, when it is determined, based on the two results, that the electric potential of the bus midpoint is imbalanced, the controller starts to adjust output power of the two conversion circuits.

In the foregoing two manners, the controller adjusts switching frequencies of control signals of the first excitation circuit and the second excitation circuit to adjust output currents of the first excitation circuit and the second excitation circuit. A value of the output current of the first excitation circuit may be positively correlated with the positive bus and offset amplitude of the electric potential of the bus midpoint, and a value of the output current of the second excitation circuit may be positively correlated with the negative bus and the offset amplitude of the electric potential of the bus midpoint. This can balance the electric potential of the bus midpoint quickly when an offset exists in the electric potential of the bus midpoint.

The first rectifier circuit 301b and the second rectifier circuit 302b are full-bridge rectifier circuits. In some embodiments, power devices included in the first rectifier circuit 301b and the second rectifier circuit 302b are diodes.

In some other embodiments, power devices included in the first rectifier circuit 301b and the second rectifier circuit 302b are controllable switching transistors. The controller controls working states of the controllable switching transistors to adjust output currents of the first rectifier circuit 301b and the second rectifier circuit 302b.

The controller may further control a working state of the three-level inverter circuit 10, that is, the controller and a controller of the three-level inverter circuit 10 may be integrated with each other.

In summary, the first excitation circuit and the second excitation circuit of the electric excitation circuit respectively obtain power from the two bus capacitors; and the controller controls the working states of the first excitation circuit and the second excitation circuit and makes power consumption different when the electric excitation circuit obtains power from the two bus capacitors, thereby balancing the electric potential of the bus midpoint. By multiplexing the electric excitation circuit, no additional equalization circuit needs to be added in this solution. In addition, the electric potential of the bus midpoint can be balanced even if an offset of the electric potential of the bus midpoint is large.

In addition, power may be separately obtained from the two bus capacitors, and it is required that withstand voltages of power devices (the controllable switching transistors S1-S8) in the first excitation circuit and the second excitation circuit should be approximately half of those in the solution of the conventional technology, so that a switching loss of the power devices is reduced. At same output power, the electric excitation circuit may choose to use power devices with lower withstand voltages. Furthermore, when a volume of the power battery pack remains unchanged, currently, to increase a distance per charge of an electric vehicle to the utmost, a high-voltage power battery pack is usually selected for power supply. The electric drive system may implement a power supply solution by using the high-voltage power battery pack.

Embodiment 3

The following describes another implementation of the electric excitation circuit.

Figure 9:
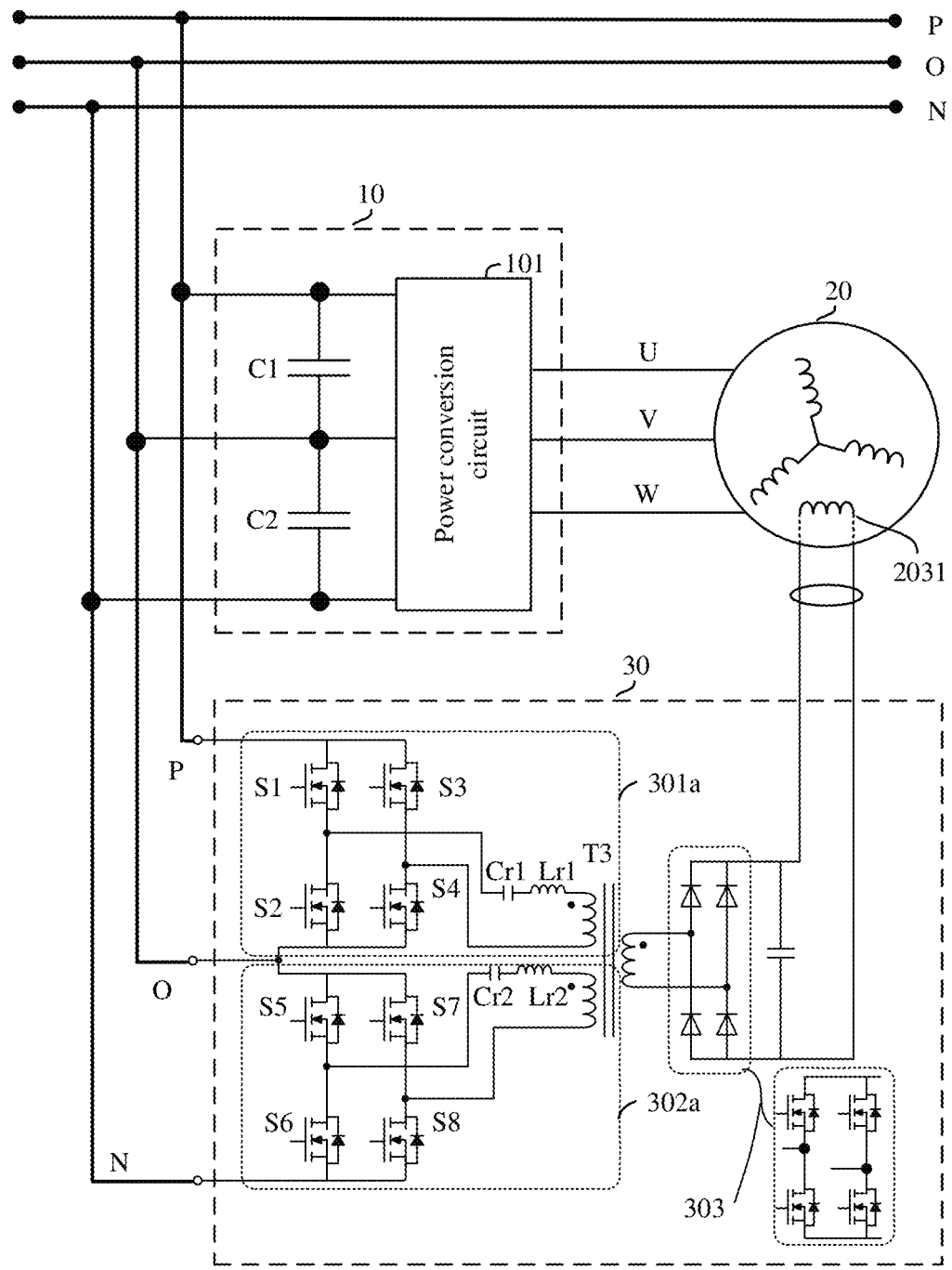
FIG. 9 is a schematic diagram of still another electric drive system according to an embodiment.

FIG. 9 is a schematic diagram of still another electric drive system according to an embodiment.

The electric excitation circuit includes a first excitation circuit, a second excitation circuit, and a third rectifier circuit 303.

An input terminal of the first excitation circuit is a first input terminal of the electric excitation circuit 30.

The first excitation circuit may include a first LLC resonant conversion circuit 301a, and may include a full-bridge inverter circuit formed by switching transistors S1-S4, a capacitor Cr1, an inductor Lr1, and one primary-side winding of a third transformer T3.

An input terminal of the second excitation circuit is a second input terminal of the electric excitation circuit 30.

The second excitation circuit may include a second LLC resonant conversion circuit 302a, and may include a full-bridge inverter circuit formed by switching transistors S5-S8, a capacitor Cr2, an inductor Lr2, and the other primary-side winding of the third transformer T3.

Primary-side windings of the first LLC resonant conversion circuit 301a and the second LLC resonant conversion circuit 302a have a same dotted terminal and a same quantity of coil turns and share a magnetic core of the third transformer T3, and a secondary-side winding of the third transformer T3 is connected to the third rectifier circuit 303.

Resonance frequencies of the first LLC resonant conversion circuit 301a and the second LLC resonant conversion circuit 302a are equal.

An output terminal of the third rectifier circuit 303 is an output terminal of the electric excitation circuit.

The following describes a control principle of a controller.

The controller controls working states of the first LLC resonant conversion circuit 301a and the second LLC resonant conversion circuit 302a based on a same control signal. In this case, the electric excitation circuit 30 can implement independent voltage balancing.

When an electric potential of a bus midpoint is balanced, the working states of the two LLC resonant conversion circuits are consistent, and there is no energy exchange.

When voltages of a positive bus and a negative bus are different, the two primary-side windings of the third transformer T3 have the same dotted terminal and share the magnetic core, that is, the windings are in a forward transformer relationship. Therefore, there is an energy exchange between the two LLC resonant conversion circuits. Energy is transferred from an LLC resonant conversion circuit with a higher input voltage to an LLC resonant conversion circuit with a lower input voltage.

When the voltage of the positive bus is higher than an absolute value of the voltage of the negative bus, energy may be transferred from the first LLC resonant conversion circuit to the second LLC resonant conversion circuit. When an absolute value of the voltage of the negative bus is higher than the voltage of the positive bus, energy is transferred from the second LLC resonant conversion circuit to the first LLC resonant conversion circuit. This implements independent voltage balancing regulation.

The controller adjusts a switching frequency of the control signal based on an excitation current needed by an exciting winding.

The third rectifier circuit 303 is a full-bridge rectifier circuit. In some embodiments, power devices included in the third rectifier circuit 303 are diodes.

In some other embodiments, power devices included in the third rectifier circuit 303 are controllable switching transistors. The controller controls working states of the controllable switching transistors to adjust an output current of the third rectifier circuit 303.

The controller may further control a working state of a three-level inverter circuit 10, that is, the controller and a controller of the three-level inverter circuit 10 may be integrated with each other.

In summary, the first excitation circuit and the second excitation circuit of the electric excitation circuit respectively obtain power from two bus capacitors; and the controller controls the first excitation circuit and the second excitation circuit based on the same control signal, so that there is an energy exchange between the two LLC resonant conversion circuits, thereby implementing independent voltage balancing regulation. By multiplexing the electric excitation circuit, no additional equalization circuit needs to be added in this solution. In addition, the electric potential of the bus midpoint can be balanced even if an offset of the electric potential of the bus midpoint is large.

In addition, power may be separately obtained from the two bus capacitors, and it is required that withstand voltages of power devices (the controllable switching transistors S1-S8) in the first excitation circuit and the second excitation circuit should be approximately half of those in the solution of the conventional technology, so that a switching loss of the power devices is reduced. At same output power, the electric excitation circuit may choose to use power devices with lower withstand voltages. Furthermore, when a volume of a power battery pack remains unchanged, currently, to increase a distance per charge of an electric vehicle to the utmost, a high-voltage power battery pack is usually selected for power supply. The electric drive system may implement a power supply solution by using the high-voltage power battery pack.

Embodiment 4

Based on the electric drive system provided in the foregoing embodiments, an embodiment may further provide a control method applied to the electric drive system. For an implementation and a working principle of the electric drive system, reference may be made to descriptions in the foregoing embodiments. Details are not described in this embodiment.

Figure 10:
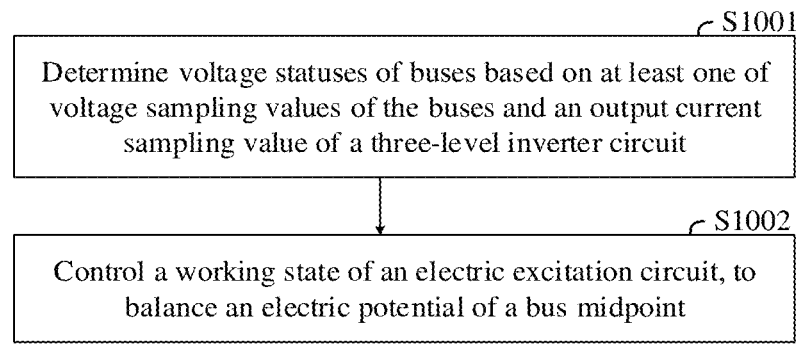
FIG. 10 is a flowchart of a control method for an electric drive system according to an embodiment.

FIG. 10 is a flowchart of a control method for an electric drive system according to an embodiment.

The illustrated method includes the following steps:

S1001. Determine voltage statuses of buses based on at least one of voltage sampling values of the buses and an output current sampling value of a three-level inverter circuit.

The voltage sampling values of the buses directly represent current voltages of a positive bus and a negative bus. When a voltage sampling value of the positive bus is different from an absolute value of a voltage sampling value of the negative bus, it indicates that an electric potential of a bus midpoint is imbalanced in this case.

The output current sampling value of the three-level inverter circuit can represent current voltage statuses of the positive bus and the negative bus. A direct current component of the output current is zero when the electric potential of the bus midpoint is balanced. A direct current component of the output current is greater than zero when the voltage of the positive bus is higher than that of the negative bus. A direct current component of the output current is less than zero when the voltage of the positive bus is lower than that of the negative bus.

S1002. Control a working state of an electric excitation circuit, to balance the electric potential of the bus midpoint.

The electric excitation circuit includes a first excitation circuit and a second excitation circuit. The first excitation circuit obtains power from a first bus capacitor, and the second excitation circuit obtains power from a second bus capacitor. The first excitation circuit includes a first LLC resonant conversion circuit, and the second excitation circuit includes a second LLC resonant conversion circuit.

In a possible implementation, output terminals of the first excitation circuit and the second excitation circuit are connected in parallel.

The following describes a method for balancing the electric potential of the bus midpoint by using the voltage sampling values of the buses.

When the voltage sampling value of the positive bus is equal to the absolute value of the voltage sampling value of the negative bus, it indicates that the electric potential of the bus midpoint is balanced. In this case, the first LLC resonant conversion circuit and the second LLC resonant conversion circuit are controlled to output currents with a same value, and a sum of the two currents is a currently needed excitation current.

When the voltage sampling value of the positive bus is greater than the absolute value of the voltage sampling value of the negative bus, it indicates that the voltage of the positive bus is greater than an absolute value of the voltage of the negative bus in this case. A currently needed excitation current is obtained and a sum of output currents of the first LLC resonant conversion circuit and the second LLC resonant conversion circuit is controlled to be the currently needed excitation current, and an output current of the first LLC resonant conversion circuit is greater than an output current of the second LLC resonant conversion circuit. In this case, the first LLC resonant conversion circuit obtains more quantity of electricity from the first bus capacitor C1, and then the voltage of the positive bus is made decreased. When the voltage of the positive bus decreases to the absolute value of the voltage of the negative bus, the first LLC resonant conversion circuit and the second LLC resonant conversion circuit are controlled to output currents with a same value.

When the voltage sampling value of the positive bus is less than the absolute value of the voltage sampling value of the negative bus, it indicates that the voltage of the positive bus is less than an absolute value of the voltage of the negative bus in this case. A currently needed excitation current is obtained and a sum of output currents of the first LLC resonant conversion circuit and the second LLC resonant conversion circuit is controlled to be the currently needed excitation current, and an output current of the first LLC resonant conversion circuit is less than an output current of the second LLC resonant conversion circuit. In this case, the second LLC resonant conversion circuit obtains more quantity of electricity from the second bus capacitor C2, and then the absolute value of the voltage of the negative bus is made decreased. When the absolute value of the voltage of the negative bus decreases to the voltage of the positive bus, the first LLC resonant conversion circuit and the second LLC resonant conversion circuit are controlled to output currents with a same value.

The following describes a method for balancing the electric potential of the bus midpoint by using the output current sampling value of the three-level inverter circuit.

When a direct current component of the output current sampling value is zero, the first LLC resonant conversion circuit and the second LLC resonant conversion circuit are controlled to output a same current. A sum of the two currents is a currently needed excitation current.

When a direct current component of the output current sampling value is greater than zero, a currently needed excitation current is obtained and a sum of output currents of the first LLC resonant conversion circuit and the second LLC resonant conversion circuit is controlled to be the currently needed excitation current, and an output current of the first LLC resonant conversion circuit is greater than an output current of the second LLC resonant conversion circuit. Then, the voltage of the positive bus is made decreased. When the voltage of the positive bus decreases to the absolute value of the voltage of the negative bus, the first LLC resonant conversion circuit and the second LLC resonant conversion circuit are controlled to output currents with a same value.

When a direct current component of the output current sampling value is less than zero, a currently needed excitation current is obtained and a sum of output currents of the first LLC resonant conversion circuit and the second LLC resonant conversion circuit is controlled to be the currently needed excitation current, and an output current of the first LLC resonant conversion circuit is less than an output current of the second LLC resonant conversion circuit. Then, the absolute value of the voltage of the negative bus is made decreased. When the absolute value of the voltage of the negative bus decreases to the voltage of the positive bus, the first LLC resonant conversion circuit and the second LLC resonant conversion circuit are controlled to output currents with a same value.

In another possible implementation, the electric excitation circuit uses the implementation shown in FIG. 9.

Working states of the first LLC resonant conversion circuit and the second LLC resonant conversion circuit are controlled based on a same control signal. In this case, the electric excitation circuit can implement independent voltage balancing.

When the electric potential of the bus midpoint is balanced, the working states of the two LLC resonant conversion circuits are consistent, and there is no energy exchange.

When the voltages of the positive bus and the negative bus are different, the two primary-side windings of the third transformer T3 have the same dotted terminal and share the magnetic core, that is, the windings are in a forward transformer relationship. Therefore, there is an energy exchange between the two LLC resonant conversion circuits. Energy is transferred from an LLC resonant conversion circuit with a higher input voltage to an LLC resonant conversion circuit with a lower input voltage.

When the voltage of the positive bus is higher than the absolute value of the voltage of the negative bus, energy may be transferred from the first LLC resonant conversion circuit to the second LLC resonant conversion circuit. When the absolute value of the voltage of the negative bus is higher than the voltage of the positive bus, energy is transferred from the second LLC resonant conversion circuit to the first LLC resonant conversion circuit. This implements independent voltage balancing regulation.

In summary, the electric potential of the bus midpoint is balanced by using the control method provided in this embodiment. In addition, it is required that withstand voltages of power devices in each conversion circuit should be approximately half of those in the solution of the conventional technology, so that a switching loss of the power devices is reduced. At same output power, the electric excitation circuit may select power devices with lower withstand voltages.

Embodiment 5

An embodiment may further provide an electric excitation circuit applied to the electric drive system in the foregoing embodiments. The electric excitation circuit is configured to output an excitation current to an exciting winding.

The electric excitation circuit includes a first input terminal, a second input terminal, a third input terminal, an output terminal, and a control terminal. The first input terminal is connected to a positive bus of the electric drive system, the second input terminal is connected to a bus midpoint, and the third input terminal is connected to a negative bus of the electric drive system. The output terminal is connected to the exciting winding of a motor and is configured to output the excitation current to the exciting winding. The control terminal is configured to receive a control signal. The electric excitation circuit is configured to balance an electric potential of the bus midpoint under the control of the control signal.

The following provides a description with reference to the implementations.

Figure 11:
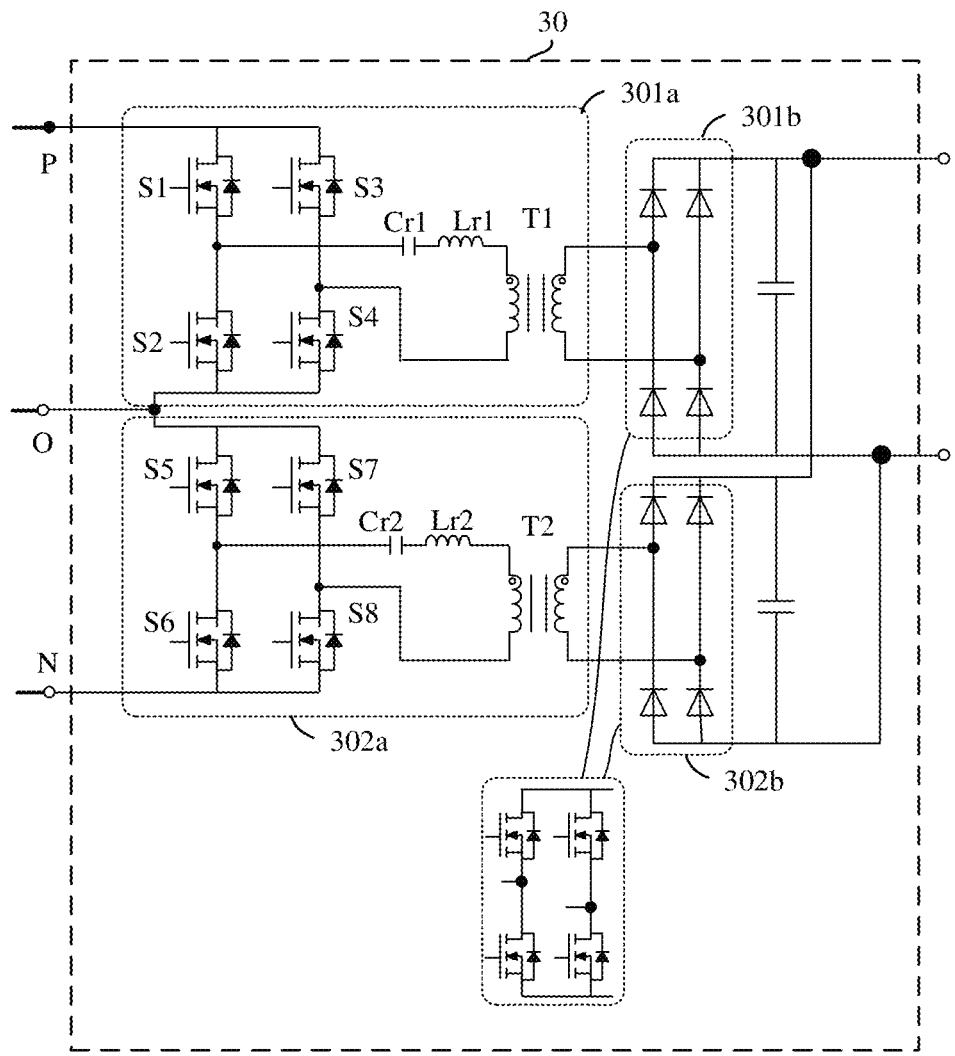
FIG. 11 is a schematic diagram of an electric excitation circuit according to an embodiment.

FIG. 11 is a schematic diagram of an electric excitation circuit according to an embodiment.

The illustrated electric excitation circuit 30 includes a first excitation circuit and a second excitation circuit.

A first port P of an input terminal of the first excitation circuit is the first input terminal, and a second port O of the input terminal of the first excitation circuit is the second input terminal.

A first port N of an input terminal of the second excitation circuit is the third input terminal, and the second port O of the input terminal of the first excitation circuit is the second input terminal.

An output terminal of the first excitation circuit is connected in parallel to an output terminal of the second excitation circuit, and then the two output terminals are connected to the output terminal of the electric excitation circuit.

An input terminal of a first LLC resonant conversion circuit 301*a* is the input terminal of the first excitation circuit, and an output terminal of the first LLC resonant conversion circuit 301*a* is connected to an input terminal of a first rectifier circuit 301*b*.

The illustrated first LLC resonant conversion circuit 301*a* includes a full-bridge inverter circuit formed by switching transistors S1-S4, a capacitor Cr1, an inductor Lr1, and a first transformer T1.

An output terminal of the first rectifier circuit 301*b* is the output terminal of the first excitation circuit.

An input terminal of a second LLC resonant conversion circuit 302*a* is the input terminal of the second excitation circuit, and an output terminal of the second LLC resonant conversion circuit 302*a* is connected to an input terminal of a second rectifier circuit 302*b*.

The illustrated second LLC resonant conversion circuit 302*a* includes a full-bridge inverter circuit formed by switching transistors S5-S8, a capacitor Cr2, an inductor Lr2, and a second transformer T2.

An output terminal of the second rectifier circuit 302*b* is the output terminal of the second excitation circuit.

Figure 12:
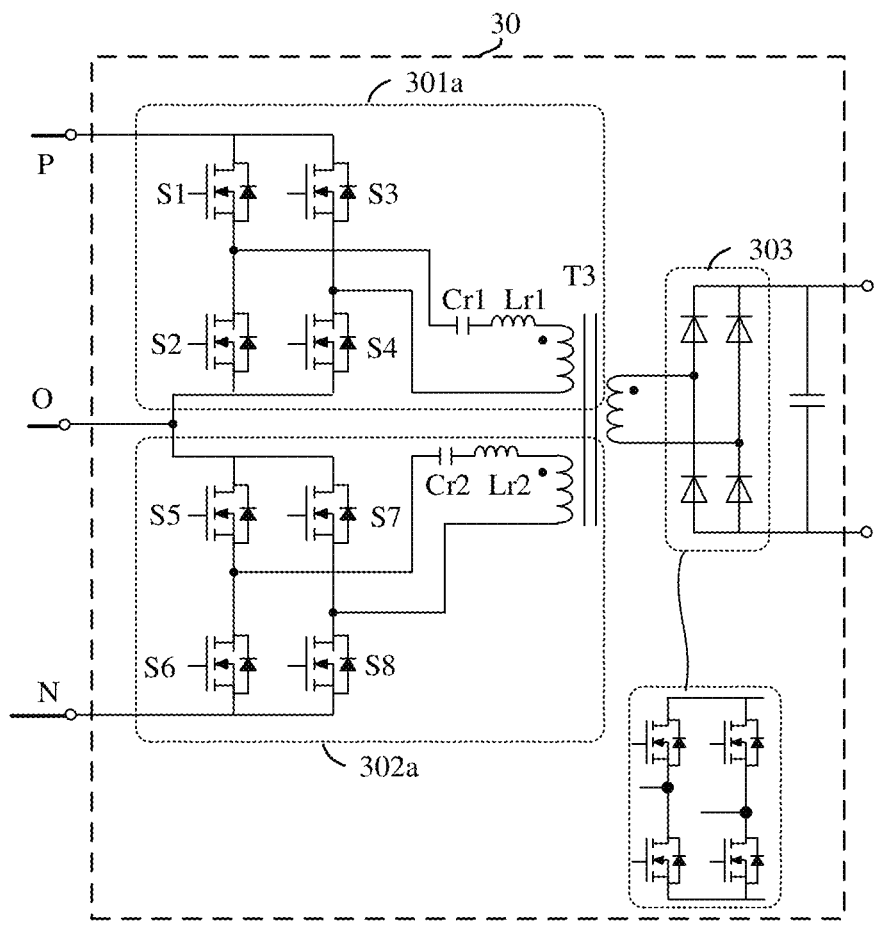
FIG. 12 is a schematic diagram of another electric excitation circuit according to an embodiment.

FIG. 12 is a schematic diagram of another electric excitation circuit according to an embodiment.

The electric excitation circuit includes a first excitation circuit, a second excitation circuit, and a third rectifier circuit 303.

A first port P of an input terminal of the first excitation circuit is the first input terminal, and a second port O of the input terminal of the first excitation circuit is the second input terminal. The first excitation circuit may include a first LLC resonant conversion circuit 301*a*, and may include a full-bridge inverter circuit formed by switching transistors S1-S4, a capacitor Cr1, an inductor Lr1, and one primary-side winding of a third transformer T3.

A first port N of an input terminal of the second excitation circuit is the third input terminal, and the second port O of the input terminal of the first excitation circuit is the second input terminal. The second excitation circuit may include a second LLC resonant conversion circuit 302*a* and may include a full-bridge inverter circuit formed by switching transistors S5-S8, a capacitor Cr2, an inductor Lr2, and the other primary-side winding of the third transformer T3.

Primary-side windings of the first LLC resonant conversion circuit 301*a* and the second LLC resonant conversion circuit 302*a* have a same dotted terminal and a same quantity of coil turns and share a magnetic core of the third transformer T3, and a secondary-side winding of the third transformer T3 is connected to the third rectifier circuit 303.

Resonance frequencies of the first LLC resonant conversion circuit 301*a* and the second LLC resonant conversion circuit 302*a* are equal.

An output terminal of the third rectifier circuit 303 is an output terminal of the electric excitation circuit 30.

In summary, the input terminals of the electric excitation circuit obtain power not from a power battery pack but respectively from two bus capacitors. A working state of the electric excitation circuit is controlled, and power consumption may be made different when the electric excitation circuit obtains power from the two bus capacitors, thereby balancing the electric potential of the bus midpoint. By using the electric excitation circuit, the electric potential of the bus midpoint can be balanced even if an offset of the electric potential of the bus midpoint is large.

Power may be separately obtained from the two bus capacitors, and it is required that withstand voltages of power devices in the electric excitation circuit should be approximately half of those in the solution of the conventional technology, so that a switching loss of the power devices is reduced. At same output power, the electric excitation circuit may choose to use power devices with lower withstand voltages. In addition, it is also more convenient to implement a power supply solution by using a high-voltage power battery pack.

Embodiment 6

Based on the electric drive system provided in the foregoing embodiments, an embodiment may further provide a powertrain of an electric vehicle. The following provides a description with reference to the accompanying drawings.

Figure 13:
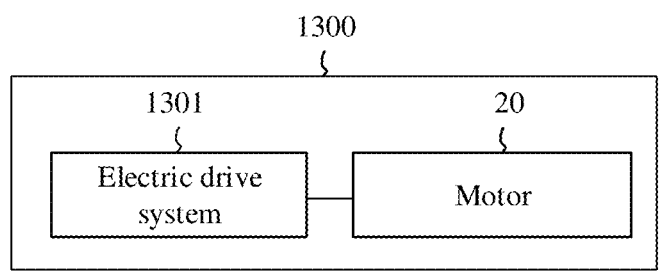
FIG. 13 is a schematic diagram of a powertrain of an electric vehicle according to an embodiment.

FIG. 13 is a schematic diagram of a powertrain of an electric vehicle according to an embodiment.

The powertrain 1300 includes an electric drive system 1301 and a motor 20.

The electric drive system 1301 includes a bus, a three-level inverter circuit, an electric excitation circuit, and a controller.

For an implementation and a working principle of the electric drive system 1301, reference may be made to descriptions in the foregoing embodiments. Details are not described in this embodiment.

The motor 20 may be an electric excitation motor or a hybrid excitation motor, and the motor 20 includes an exciting winding.

The motor 20 is connected to an output terminal of the three-level inverter circuit and is configured to convert electrical energy into mechanical energy to drive the electric vehicle.

In summary, the powertrain provided in this embodiment may include the electric drive system, input terminals of the electric excitation circuit in the electric drive system respectively obtain power from two bus capacitors; and the controller controls a working state of the electric excitation circuit, and makes power consumption different when the electric excitation circuit obtains power from the two bus capacitors, thereby balancing an electric potential of a bus midpoint. By multiplexing the electric excitation circuit, no additional equalization circuit needs to be added in this solution. In addition, the electric potential of the bus midpoint can be balanced even if an offset of the electric potential of the bus midpoint is large. Therefore, the powertrain can take full advantage of the three-level electric drive system, effectively improve efficiency of the electric drive system, reduce output voltage harmonic waves, and optimize electromagnetic interference performance.

Moreover, when an existing electric excitation circuit directly obtains power from a power battery pack, a requirement on withstand voltages of power devices in the electric excitation circuit is high, which leads to a difficulty in model selection and high costs. In contrast, power may be separately obtained from the two bus capacitors, and it is required that withstand voltages of power devices in the electric excitation circuit should be approximately half of those in the solution of the conventional technology, so that a switching loss of the power devices is reduced. At same output power, the electric excitation circuit may choose to use power devices with lower withstand voltages. Furthermore, when a volume of the power battery pack remains unchanged, currently, to increase a distance per charge of the electric vehicle to the utmost, a high-voltage power battery pack is usually selected for power supply. The powertrain may implement a power supply solution by using the high-voltage power battery pack.

Embodiment 7

Based on the powertrain of the electric vehicle provided in the foregoing embodiment, an embodiment may further provide an electric vehicle. The following provides a detailed description with reference to the accompanying drawings.

Figure 14:
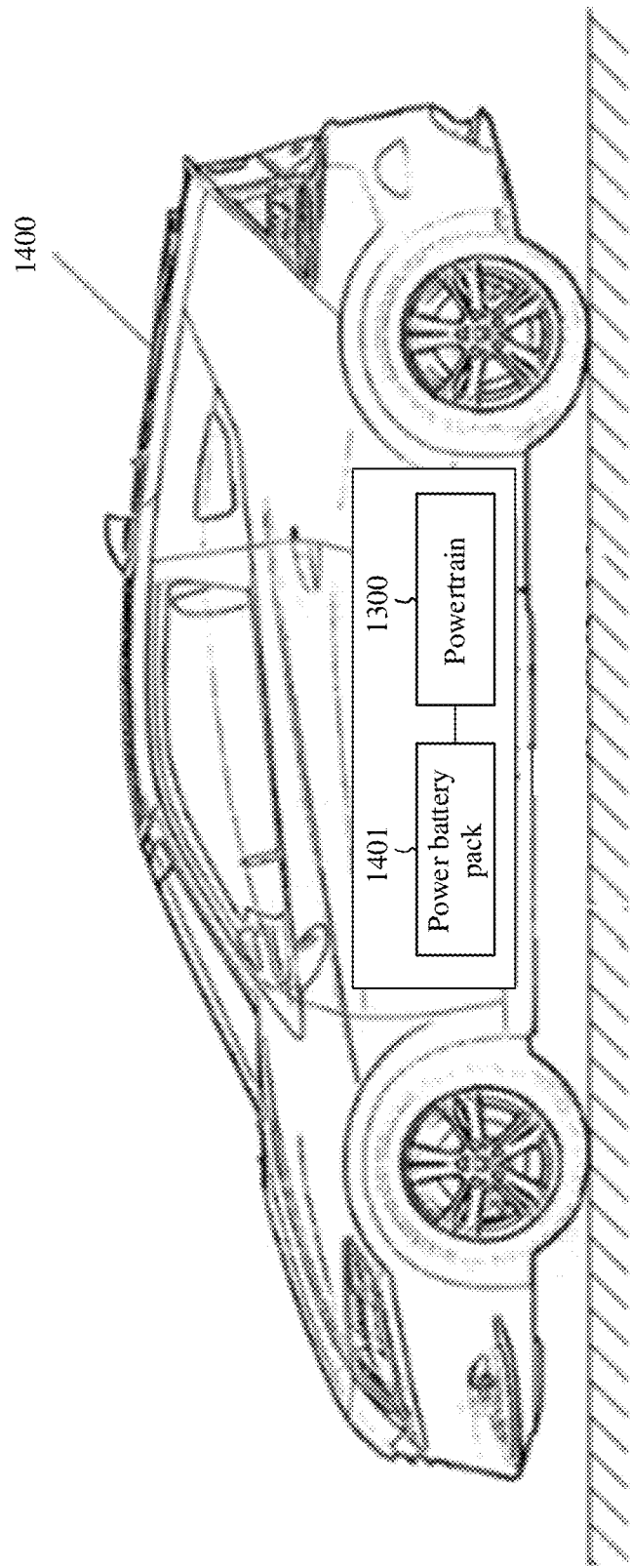
FIG. 14 is a schematic diagram of an electric vehicle according to an embodiment.

FIG. 14 is a schematic diagram of an electric vehicle according to an embodiment.

The electric vehicle 1400 includes a power battery pack 1401 and a powertrain 1300.

The power battery pack 1401 is configured to provide a needed direct current power supply for the powertrain 1300.

The powertrain 1300 includes an electric drive system and a hybrid excitation motor.

The electric drive system includes a bus, a three-level inverter circuit, an electric excitation circuit, and a controller.

For an implementation and a working principle of the electric drive system, reference may be made to descriptions in the foregoing embodiments. Details are not described in this embodiment.

In summary, the electric vehicle includes the electric drive system provided in the foregoing embodiments, input terminals of the electric excitation circuit in the electric drive system respectively obtain power from two bus capacitors; and the controller controls a working state of the electric excitation circuit and makes power consumption different when the electric excitation circuit obtains power from the two bus capacitors, thereby balancing an electric potential of a bus midpoint. By multiplexing the electric excitation circuit, no additional equalization circuit needs to be added in this solution. In addition, the electric potential of the bus midpoint can be balanced even if an offset of the electric potential of the bus midpoint is large.

Moreover, when an existing electric excitation circuit directly obtains power from the power battery pack, a requirement on withstand voltages of power devices in the electric excitation circuit is high, which leads to a difficulty in model selection and high costs. In contrast, power may be separately obtained from the two bus capacitors, and it is required that withstand voltages of power devices in the electric excitation circuit should be approximately half of those in the solution of the conventional technology, so that a switching loss of the power devices is reduced. At same output power, the electric excitation circuit may choose to use power devices with lower withstand voltages. Furthermore, when a volume of the power battery pack remains unchanged, currently, to increase a distance per charge of the electric vehicle to the utmost, a high-voltage power battery pack is usually selected for power supply. The powertrain may implement a power supply solution by using the high-voltage power battery pack.

"At least one (item)" means one or more, and "a plurality of" means two or more. A term "and/or" is used to describe an association relationship between associated objects and represents that three relationships may exist. For example, "A and/or B" may represent the following three cases: only A exists, only B exists, and both A and B exist, where A and B may be singular or plural. A character "/" usually represents an "or" relationship between associated objects. "At least one of the following items (pieces)" or a similar expression thereof indicates any combination of these items, including a single item (piece) or any combination of a plurality of items (pieces). For example, at least one item (piece) of a, b, or c may represent a, b, c, "a and b", "a and c", "b and c", or "a, b, and c", where a, b, and c each may be in a singular or plural form.

The embodiments are all described in a progressive manner, for same or similar parts in the embodiments, reference may be made to these embodiments, and each embodiment focuses on a difference from other embodiments. In addition, some or all of the units and modules may be selected depending on actual requirements, to achieve objectives of the solutions of the embodiments. A person of ordinary skill in the art can understand and implement the solutions of the embodiments without creative efforts.

The foregoing descriptions are merely implementations. It should be noted that a person of ordinary skill in the art can further make several improvements and modifications without departing from the scope of the embodiments.

What is claimed is:

1. An electric drive system, configured to connect to a power battery pack to drive a motor, wherein the motor comprises an exciting winding, and the electric drive system comprises:

a bus comprising a positive bus and a negative bus;

a three-level inverter circuit comprising a first bus capacitor and a second bus capacitor, wherein the first bus capacitor is connected between the positive bus and a bus midpoint, and the second bus capacitor is connected between the negative bus and the bus midpoint;

an electric excitation circuit comprising a first input terminal, a second input terminal, and an output terminal, wherein the first input terminal of the electric excitation circuit is connected in parallel to the first bus capacitor, the second input terminal of the electric excitation circuit is connected in parallel to the second bus capacitor, and the output terminal of the electric excitation circuit is connected to the exciting winding; and a controller, wherein the controller is configured to control a working state of the electric excitation circuit to balance an electric potential of the bus midpoint.

2. The electric drive system according to claim 1, wherein the electric excitation circuit further comprises a first excitation circuit and a second excitation circuit;

an input terminal of the first excitation circuit is the first input terminal of the electric excitation circuit; and an input terminal of the second excitation circuit is the second input terminal of the electric excitation circuit.

3. The electric drive system according to claim 2, wherein an output terminal of the first excitation circuit is connected in parallel to an output terminal of the second excitation circuit, and then the two output terminals are connected to the output terminal of the electric excitation circuit; and the controller is further configured to control working states of the first excitation circuit and the second excitation circuit based on an excitation current needed by the exciting winding and at least one of voltage sampling values of the buses and an output current sampling value of the three-level inverter circuit.

4. The electric drive system according to claim 3, wherein the controller is further configured to adjust switching frequencies of control signals of the first excitation circuit and the second excitation circuit to adjust output currents of the first excitation circuit and the second excitation circuit; a value of the output current of the first excitation circuit is positively correlated with the positive bus and an offset amplitude of the electric potential of the bus midpoint; and a value of the output current of the second excitation circuit is positively correlated with the negative bus and the offset amplitude of the electric potential of the bus midpoint.

5. The electric drive system according to claim 3, wherein the first excitation circuit comprises a first LLC resonant conversion circuit and a first rectifier circuit, and the second excitation circuit comprises a second LLC resonant conversion circuit and a second rectifier circuit;
   an input terminal of the first LLC resonant conversion circuit is the input terminal of the first excitation circuit, an output terminal of the first LLC resonant conversion circuit is connected to an input terminal of the first rectifier circuit, and an output terminal of the first rectifier circuit is the output terminal of the first excitation circuit;
   an input terminal of the second LLC resonant conversion circuit is the input terminal of the second excitation circuit, an output terminal of the second LLC resonant conversion circuit is connected to an input terminal of the second rectifier circuit, and an output terminal of the second rectifier circuit is the output terminal of the second excitation circuit; and
   the controller is further configured to control working states of the first LLC resonant conversion circuit and the second LLC resonant conversion circuit.

6. The electric drive system according to claim 5, wherein the first rectifier circuit and the second rectifier circuit comprise controllable switching transistors, and the controller is further configured to control working states of the controllable switching transistors to adjust output currents of the first rectifier circuit and the second rectifier circuit.

7. The electric drive system according to claim 2, wherein the electric excitation circuit further comprises a third rectifier circuit, the first excitation circuit comprises a first LLC resonant conversion circuit, and the second excitation circuit comprises a second LLC resonant conversion circuit;
   primary-side windings of the first LLC resonant conversion circuit and the second LLC resonant conversion circuit have a same dotted terminal and a same quantity of coil turns and share a magnetic core of one transformer, and a secondary-side winding of the transformer is connected to the third rectifier circuit;
   resonance frequencies of the first LLC resonant conversion circuit and the second LLC resonant conversion circuit are equal; and
   an output terminal of the third rectifier circuit is the output terminal of the electric excitation circuit.

8. The electric drive system according to claim 7, wherein the controller is further configured to control working states of the first LLC resonant conversion circuit and the second LLC resonant conversion circuit based on a same control signal.

9. The electric drive system according to claim 8, wherein the controller is further configured to adjust a switching frequency of the control signal based on an excitation current needed by the exciting winding.

10. The electric drive system according to claim 7, wherein the third rectifier circuit comprises controllable switching transistors, and the controller is further configured to control working states of the controllable switching transistors to adjust an output current of the third rectifier circuit.

11. The electric drive system according to claim 1, wherein the controller is further configured to control a working state of the three-level inverter circuit.

12. An electric excitation circuit, comprising: a first input terminal, a second input terminal, a third input terminal, an output terminal, and a control terminal;
    the first input terminal is connected to a positive bus of an electric drive system, the second input terminal is connected to a bus midpoint, and the third input terminal is connected to a negative bus of the electric drive system;
    the output terminal is configured to connect to an exciting winding of a motor, and is configured to output an excitation current to the exciting winding;
    the control terminal is further configured to receive a control signal; and
    the electric excitation circuit is configured to balance an electric potential of the bus midpoint under the control of the control signal.

13. The electric excitation circuit according to claim 12, further comprising a first excitation circuit and a second excitation circuit;
    a first port of an input terminal of the first excitation circuit is the first input terminal, and a second port of the input terminal of the first excitation circuit is the second input terminal; and
    a first port of an input terminal of the second excitation circuit is the third input terminal, and the second port of the input terminal of the first excitation circuit is the second input terminal.

14. The electric excitation circuit according to claim 13, wherein an output terminal of the first excitation circuit is connected in parallel to an output terminal of the second excitation circuit, and then the two output terminals are connected to the output terminal of the electric excitation circuit.

15. The electric excitation circuit according to claim 14, wherein the first excitation circuit comprises a first LLC resonant conversion circuit and a first rectifier circuit, and the second excitation circuit comprises a second LLC resonant conversion circuit and a second rectifier circuit;
    an input terminal of the first LLC resonant conversion circuit is the input terminal of the first excitation circuit, an output terminal of the first LLC resonant conversion circuit is connected to an input terminal of the first rectifier circuit, and an output terminal of the first rectifier circuit is the output terminal of the first excitation circuit; and
    an input terminal of the second LLC resonant conversion circuit is the input terminal of the second excitation circuit, an output terminal of the second LLC resonant conversion circuit is connected to an input terminal of the second rectifier circuit, and an output terminal of the second rectifier circuit is the output terminal of the second excitation circuit.

16. The electric excitation circuit according to claim 13, further comprising a third rectifier circuit, the first excitation circuit comprises a first LLC resonant conversion circuit, and the second excitation circuit comprises a second LLC resonant conversion circuit;
    primary-side windings of the first LLC resonant conversion circuit and the second LLC resonant conversion circuit have a same dotted terminal and a same quantity of coil turns and share a magnetic core of one transformer, and a secondary-side winding of the transformer is connected to the third rectifier circuit;
    resonance frequencies of the first LLC resonant conversion circuit and the second LLC resonant conversion circuit are equal; and an output terminal of the third rectifier circuit is the output terminal of the electric excitation circuit.

17. A powertrain, the powertrain comprising an electric drive system, wherein the electric drive system is configured to connect to a power battery pack to drive a motor, wherein the motor comprises an exciting winding, and the electric drive system comprises a bus, a three-level inverter circuit, an electric excitation circuit, and a controller;
the bus comprises a positive bus and a negative bus;
the three-level inverter circuit comprises a first bus capacitor and a second bus capacitor;
the first bus capacitor is connected between the positive bus and a bus midpoint, and the second bus capacitor is connected between the negative bus and the bus midpoint;
a first input terminal of the electric excitation circuit is connected in parallel to the first bus capacitor, a second input terminal of the electric excitation circuit is connected in parallel to the second bus capacitor, and an output terminal of the electric excitation circuit is connected to the exciting winding; and
the controller is further configured to control a working state of the electric excitation circuit, to balance an electric potential of the bus midpoint;
and the powertrain further comprises a motor;
the motor is a hybrid excitation motor or an electric excitation motor;
the motor is connected to an output terminal of a three-level inverter circuit; and
the motor is configured to convert electrical energy into mechanical energy to drive an electric vehicle.

18. The powertrain according to claim 17, wherein the electric excitation circuit comprises a first excitation circuit and a second excitation circuit;
an input terminal of the first excitation circuit is the first input terminal of the electric excitation circuit; and
an input terminal of the second excitation circuit is the second input terminal of the electric excitation circuit.

19. The powertrain according to claim 18, wherein an output terminal of the first excitation circuit is connected in parallel to an output terminal of the second excitation circuit, and then the two output terminals are connected to the output terminal of the electric excitation circuit; and
the controller is further configured to control working states of the first excitation circuit and the second excitation circuit based on an excitation current needed by the exciting winding and at least one of voltage sampling values of the buses and an output current sampling value of the three-level inverter circuit.

20. The powertrain according to claim 19, wherein the controller is further configured to adjust switching frequencies of control signals of the first excitation circuit and the second excitation circuit to adjust output currents of the first excitation circuit and the second excitation circuit; a value of the output current of the first excitation circuit is positively correlated with the positive bus and an offset amplitude of the electric potential of the bus midpoint; and a value of the output current of the second excitation circuit is positively correlated with the negative bus and the offset amplitude of the electric potential of the bus midpoint.

* * * * *